United States Patent

Mrosik et al.

[11] Patent Number: 6,040,898
[45] Date of Patent: Mar. 21, 2000

[54] FMCW DISTANCE MEASUREMENT PROCESS

[76] Inventors: Jan Michael Mrosik, Thalkirchner Strasse 47d, D-80337 München; Joerg Nagel, Hubertusstr. 154, D-47798 Krefeld; Christo G. Stojanoff, Eirendorfer Str. 130, D-52078 Aachen, all of Germany

[21] Appl. No.: 08/981,291
[22] PCT Filed: Jun. 19, 1996
[86] PCT No.: PCT/EP96/02636
  § 371 Date: Dec. 22, 1997
  § 102(e) Date: Dec. 22, 1997
[87] PCT Pub. No.: WO97/01107
  PCT Pub. Date: Jan. 9, 1997

[30] Foreign Application Priority Data

Jun. 20, 1995 [DE] Germany ............... 195 21 771

[51] Int. Cl.$^7$ ............... G01C 3/08; G01S 13/08
[52] U.S. Cl. ............ 356/5.09; 342/127; 342/132; 356/5.15
[58] Field of Search ............... 356/5.09, 5.15; 342/127, 132; 367/101, 125

[56] References Cited

U.S. PATENT DOCUMENTS

| | | | |
|---|---|---|---|
| 4,812,035 | 3/1989 | Freedman et al. | |
| 4,833,479 | 5/1989 | Carlson | 342/194 |
| 5,122,803 | 6/1992 | Stann et al. | 342/25 |

FOREIGN PATENT DOCUMENTS

| | | |
|---|---|---|
| 0640846 A2 | 3/1995 | European Pat. Off. |
| 4027990 C1 | 2/1992 | Germany. |

OTHER PUBLICATIONS

Woods et al; IEEE Transactions on Instr. & Meas., vol. 42, No. 4, Aug. 1993.
Wehr; Frequenz, 48(1994) 5–6; p. 123, May/Jun. 1994
Wehr; Frequenz, 48(1994) 3–4; p. 79, Mar./Apr. 1994.

Primary Examiner—Stephen C. Buczinski
Attorney, Agent, or Firm—Foley & Lardner

[57] ABSTRACT

In an FMCW distance measurement process, a wave train of carrier frequency $f_0$ is modulated with a time function $f(t)$ and subdivided into a transmission signal and into a reference signal in deterministic phase relationship with the transmission signal; the transmission signal is sent on a transmission section to be measured and the reference signal is supplied to a phase difference-forming arrangement; the signal reflected in the transmission section with a delay that corresponds to propagation time $\tau$ is also supplied as a reception signal to the phase difference-forming arrangement that forms the time difference function $\theta(t)$ between the phases of reference and reception signals; the phase difference function $\theta(t)$ is separately evaluated in a continuous fraction $\theta_=$ that corresponds to the carrier frequency $f_0$ and in an alternating fraction $\theta_\sim(t)$ that corresponds to the modulation time function $f(t)$; and the propagation time $\tau$ proportional to the distance is finally determined by evaluating together both phase difference information.

11 Claims, 3 Drawing Sheets

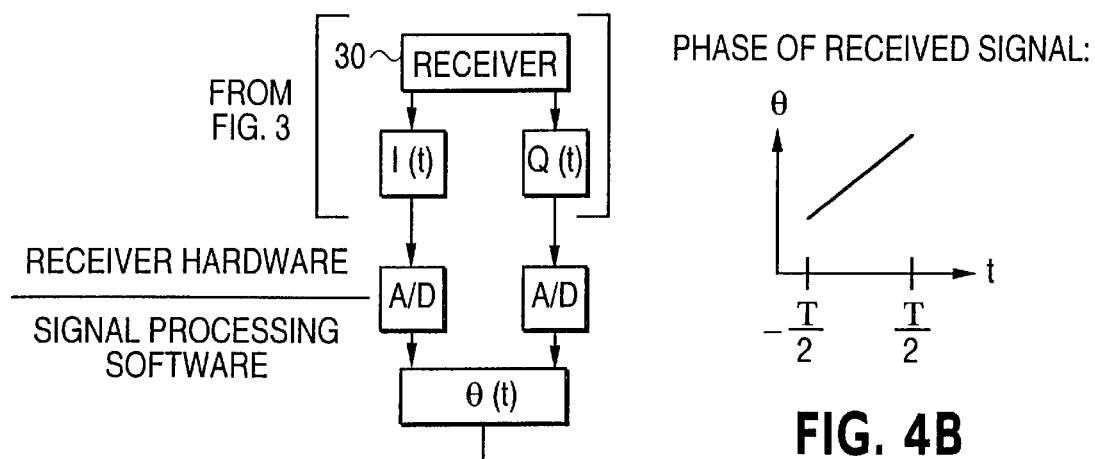
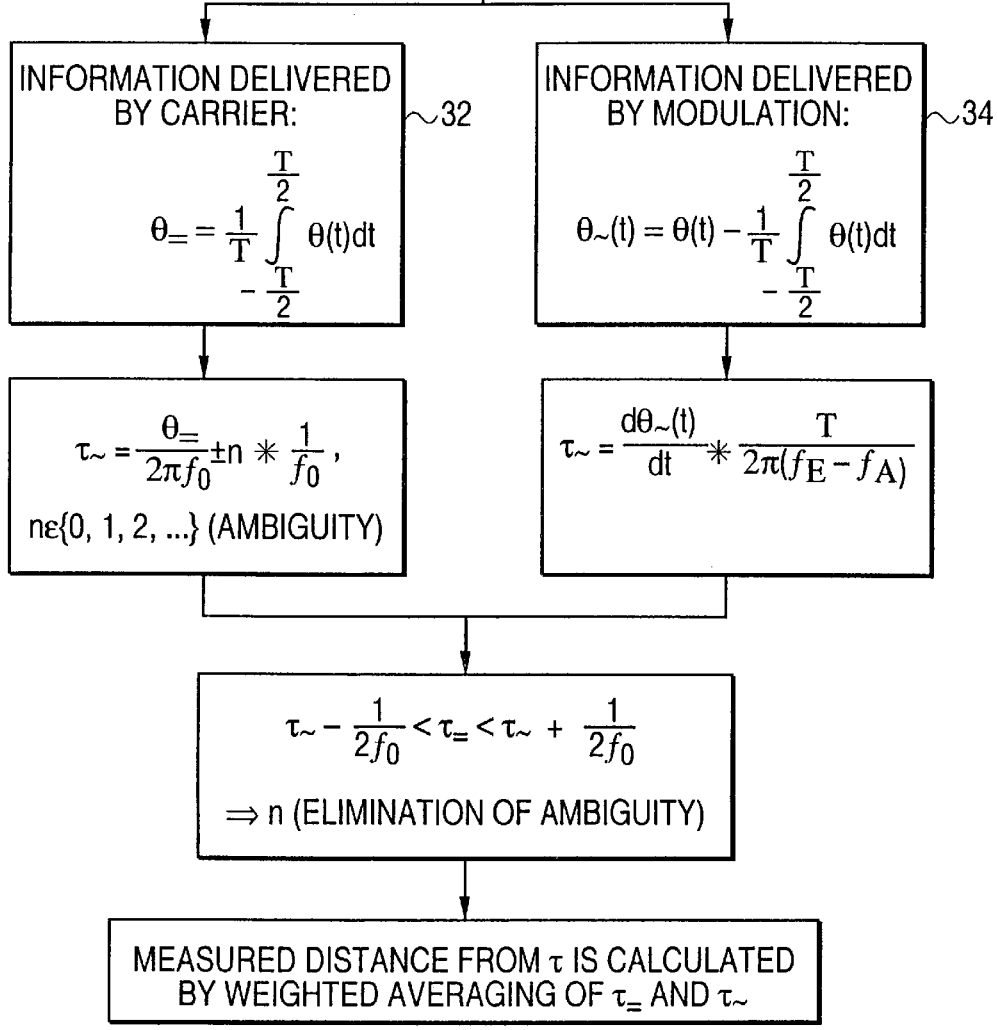

FMCW DISTANCE MEASUREMENT PROCESS

BACKGROUND OF THE INVENTION

The invention relates to an FMCW distance measurement method.

Many different types of distance measurement methods are known. The present invention relates to a contactless measurement method which is suitable for determining the distance to an object situated freely in space and, in particular, for measuring the contours of objects. Moreover, it can also be used to detect and measure imperfections in wave-guiding media and structures therein. The measurement principle consists in emitting and receiving intensity- or frequency-modulated acoustic, optical or other electromagnetic waves, in particular in the radio-frequency band. These are to be designated below in general as transmission wave and reception wave, respectively.

If the transmission wave is frequency modulated, the transmission signal can be represented by the expression $$s(t) = A \cdot \cos\left(2\pi f_0 t + 2\pi \int_{-\infty}^{t} f(\eta) d\eta\right)$$

with the amplitude A, the carrier frequency $f_0$ and the frequency modulation function $f(t)$. In the case of intensity modulation, the transmission wave assumes the general form of $$s(t) = A(t) \cdot \cos(2\pi \nu t + \epsilon)$$

with the time-dependent amplitude $A(t)$, the carrier frequency $\nu$ of the transmission wave and an arbitrary phase $\epsilon$. In the case of a sinusoidal amplitude modulation, it holds that $$A(t) = A \cdot \cos\left(2\pi f_0 t + 2\pi \int_{-\infty}^{t} f(\eta) d\eta\right)$$

where $f_0$ now represents the carrier frequency of the modulation and $f(t)$ a frequency modulation function. In the following exposition, the frequency $f_0$ is denoted as carrier frequency for all cases, and the frequency $\nu$ as transmission frequency. In the case of frequency modulation, the carrier frequency and transmission frequency are identical.

Known measurement methods are based, for example, on the pulse time delay method, in which the transmission wave is intensity-modulated using temporally limited pulses, and the distance information is derived from the measured time delay of the pulse. Such a method permits a unique measurement of a measuring point of interest or of a geometry of interest, as long as the time delay of the pulse to the object and back is shorter than the period of the pulse repetition of the system.

In the case of pulse repetition rates in the kHz region, such as occur in the case of typical systems, a very large uniqueness region results. Owing to the limited pulse energy of short pulses, which the wave-generating transmitter can output, and to the low statistical efficiency, the resolution of such systems is, however, low, or else the measuring time is long because of the summation of many measuring pulses.

In contrast thereto, the phase comparison method, which is likewise customary, is distinguished by a high statistical efficiency and thus by a high accuracy in conjunction with short measuring times. The periodicity employed in this case in the modulation of the continuously emitted and modulated waves produces, however, a limited uniqueness region determined by the modulation frequency. The requirements for higher resolution and a larger uniqueness region seem to contradict one another.

The measurement principle on which the pulse time delay method is based can be characterized in that use is made of the information in the so-called envelope of the reception signal. The envelope is given by the pulse shape of the transmission signal.

According to the results of estimation theory, the bandwidth of the modulation must be as high as possible for a high measurement resolution. This necessitates transmission pulses as short as possible. In real systems, the electrical bandwidth available is limited. In this case, the bandwidth is understood as the frequency band from the largest positive frequency to the largest negative frequency. This leads to the requirement to utilize the bandwidth of real systems with the aid of suitable modulation signals in an optimum way, and thus to configure the measuring arrangement in a statistically efficient fashion.

An optimum utilization of the electrical bandwidth results when in the case of frequency modulation the spectral energy of the signal $s(t)$, or in the case of intensity modulation that of the signal $A(t)$, is concentrated on the maximum frequency which can be transmitted by the system. Since the spectral energy of pulses is concentrated in the frequency band around the frequency source, the pulse time delay method does permit unique evaluation of the received signal for the purpose of determining the desired measured variable, but does not employ the available electrical bandwidth of the system in an optimum fashion.

Optimum utilization of the electrical bandwidth is provided, by contrast, by the phase comparison method, which can be characterized in that the so-called fine structure of the reception signal is used to obtain information. This fine structure, which contains the desired information on the distance of a measuring point in the form of a signal phase, is, however, characterized by the occurrence of ambiguities.

One possibility of achieving unique measurements and, at the same time, of permitting continuous operation of the wave transmitter consists in modulating the frequency of the transmission signal. Systems which operate according to this method are denoted as FMCW systems, the abbreviation FMCW being derived from "frequency modulated continuous wave". Such a method is described in detail, for example, in tm—Technisches Messen 62 (1995) 2, pages 66 to 73. Known methods operate predominantly in the radar region. It is obvious to transfer the FMCW concept to other frequency bands.

The FMCW concept described in the abovenamed reference consists in generating a microwave signal using a free-wheeling oscillator, and putting it as transmitted signal onto a transmission link which corresponds to the free space distance to be measured. The microwave signal serving as carrier frequency is modulated by continuous frequency variation. Continuous linearly rising or falling frequency variation is normally selected. However, it is also possible to provide a frequency variation which rises or falls in a discrete fashion.

The signal reflected in the transmission link is superimposed on the transmitted signal in a mixer, and the mixing product is evaluated after low-pass filtering. The propagation time of the reflected signal is proportional to the distance to be measured. The method is to be classed with the pulse time delay methods described above, and in this case the envelope assigned to the pulse is to be assigned to the frequency modulation of the signal.

The evaluation method for determining the propagation time of the reflected signal can be described with the aid of the mixing process of two different frequencies. It is expedient in this case to use a complex mixing process, in which the signal generated by the oscillator is mixed both with the reflected signal in the case of an unchanged phase and with the reflected signal when phase-shifted by 90°. The behaviour of the mixer corresponds to an analog multiplier. This signal processing is known as the homodyne method in radio-frequency engineering.

If the frequency modulation of the transmission signal is represented in an f(t) diagram, the result in the case of linear frequency variation is a linearly rising straight line between the initial instant of the frequency variation and the final instant. The same straight line results for the reflected signal, but shifted in the diagram by the propagation time with respect to the first straight line. Considering the difference between the frequencies associated with the two straight lines at a specific instant after reception of the reflected signal results in a differential frequency which depends only on the propagation time delay of the reception signal and thus on the distance to be measured. The differential frequency is the same for every instant within the modulation period. It is smaller by orders of magnitude than the signal frequencies, and thus easy to process metrologically. The distance measurement is unique, as long as the modulation period is longer than the propagation time delay. The above-named mixing process with subsequent low-pass filtering serves to generate a measuring signal monofrequent with the differential frequency, the homodyne signal processing supplying both a sinusoidal signal proportional to the differential frequency and a cosinusoidal signal.

In the case of discrete linear frequency modulation, the method supplies individual sampling points of the sinusoidal and cosinusoidal signals given discrete modulation frequencies. In the case of a modulation frequency varying in a nonlinear fashion, the differential frequency varies over the modulation period.

Various methods are specified in the specified reference for the purpose of determining the differential frequency containing the distance information. The method of mean phase deviation consists in measuring the phase shift between the transmission signal and reception signal for different instantaneous modulation frequencies, and plotting it on a phase-frequency diagram. If a mean straight line is determined for the measured values, its gradient is proportional to the abovenamed differential frequency, and thus to the distance.

Fourier transformation of the differential frequency signal can also be performed in order to determine the differential frequency. The result in this case is a sine(x)/x function in the frequency band, whose absolute maximum is at the point of the differential frequency.

Various statistical methods, which are known per se and are not the subject-matter of the invention, can be used for signal evaluation.

SUMMARY OF THE INVENTION

The accuracy of all distance measurement methods depends on the signal-to-noise ratio in the reception signal, on the measuring time and the bandwidth of the transmission signal. A further parameter is the uniqueness of the measurement. The essential task is to find as suitable as possible a combination of the modulation of the transmission wave and the associated methods of reception and evaluation. The particular aims in this case are a high statistical effectiveness of this combination and as large as possible a uniqueness region for the measurements. Even using the known FMCW case methods, this problem has not so far been solved satisfactorily in technical terms.

It is an object of the invention to increase the accuracy of unique FMCW distance measurement in conjunction with a short measuring time to such an extent that it corresponds to the accuracy which can be achieved using the phase comparison method. The possibility of simultaneously measuring a plurality of measuring points should also be created.

According to the invention, this object is achieved in the case of an FMCW distance measurement method by means of the features described herein. Advantageous embodiments of the method follow from the features described below.

The invention is based on the finding that the information present in the reception signal of the FMCW system can be split into an information component, which is located in the envelope of the signal and can be traced back to the frequency modulation of the signal, and into a fine structure component which in the case of frequency modulation resides in the phase difference of the mean frequency of the transmission and reception signals, and in the case of intensity modulation resides in the phase difference of the mean frequency of the modulation function of the transmission and reception signals.

The known FMCW systems use only the envelope information of the received signal, and thus take no account of a decisive component of the fine structure information additionally available. For this reason, the measurement performance achieved so far is substantially weaker given identical system parameters than in the case of the method according to the invention, in which both the envelope information and the fine structure information of the received signal are now utilized in combination. It is therefore possible to use given system parameters in order to achieve a measurement resolution increased by a multiple, or else a measuring time reduced by a multiple, when compared with systems customary so far.

As already stated, the frequency modulation of the signal can be performed both by frequency modulation of the intensity of the carrier wave and by modulation of the frequency of the transmission wave. In optical systems, the terms incoherent and coherent systems are used in this context.

Since the main signal information which is decisive for the accuracy resides in the fine structure information of the carrier, the envelope bandwidth can now be selected to be so small that it still ensures evaluation of the fine structure information while the uniqueness of the measurement is simultaneously preserved. This is the case when it holds that $$\frac{E}{N_0} \gg \frac{(2\pi f_0)^2}{\beta_T^2}$$

in this case $f_0$ is the carrier frequency, $\beta_T$ is a so-called effective bandwidth of the envelope produced by the frequency modulation, E is the energy of the reception signal and $N_0$ is the spectral noise power density in the reception signal. Consequently, given appropriate dimensioning of the modulation parameters the method according to the invention permits a utilization of the electrical bandwidth of the system which corresponds to the classical phase comparison method and simultaneously ensures the uniqueness of the measurements.

The envelope information and fine structure information are evaluated in the first step by determining the time phase difference θ(t) between a reference signal and the reception signal. The reference signal is a signal which has a deterministic phase relationship with the transmission signal. A suitable reference signal can be provided, for example, by decoupling a component of the modulated transmission wave. On the other hand, there is a possibility of decoupling a component of the signal modulating the intensity of the carrier wave. In both cases, before the formation of the phase difference, the reference signal can, just like the reception signal, traverse a preprocessing network of electric type or comprising a waveguiding medium. Such a network can, for example, serve the purpose of carrying out a frequency conversion or a propagation time delay, or of conditioning the signal in another way. A generator synchronized with the transmission signal or the modulation signal can likewise be used to generate the reference signal.

The intensity or frequency of the transmission wave is to be modulated in accordance with $$\cos\left(2\pi f_0 t + 2\pi \int_{-\infty}^{t} f(\eta) d\eta\right)$$

for the purpose of explaining the relationships not so far recognized and evaluated between the envelope information and the fine structure information, f (t) representing a time function and $f_0$ a carrier frequency or, in other words, the frequency $f_0$ of a carrier wave is modulated by a time function f(t). Without restricting generality, it is possible in the following to ignore the influence of a preprocessing network for the reception or reference signal. The time difference function of the phases between the reference and reception signals is then $$\theta(t) = 2\pi f_0 \tau + 2\pi \int_{t-\tau}^{t} f(\eta) d\eta$$

where τ is the propagation time of the reception signal between the transmitter, measuring point or measurement object and receiver. The instantaneous frequency of the modulated transmission signal $$f_0 + f(t) = f_- + f_-(t)$$

can be split into a direct component $f_-$ and an alternating component $f_-(t)$ for arbitrary characteristics. In this case, the time-constant frequencies $f_0$ and any constant components of f(t) are combined in $f_-$. The result for the time phase difference function θ(t) is, after integration over short propagation times τ, $$\theta(t) = 2\pi\tau(f_- + f_-(t)) = \theta_- + \theta_-(t)$$

where $$\theta_- = 2\pi\tau f_- \text{ and } \theta_-(T) = 2\pi\tau f_-(t)$$

If $f_-$ and $f_-(t)$ are known, the propagation time τ can therefore be determined by two mutually independent functions given that $\theta_-$ and $\theta_-(t)$ have been measured.

In this case, $\theta_-$ and $\theta_-(t)$ are the direct component and the alternating component of the time phase difference function. Both $\theta_-$ and $\theta_-(t)$ are linearly dependent on the propagation time for short propagation times τ, and so it is possible to obtain two statistically independent values for the signal propagation time by evaluating $\theta_-$ and $\theta_-(t)$. The consideration of short propagation time τ is valid without restrictions for industrial distance measurements.

For long propagation times τ, the phase difference function can be correspondingly decomposed into a direct component $$\theta_- = g'(\tau, f_-)$$

and an alternating component $$\theta_-(t) = g''(\tau, f_-(t))$$

from which components it is possible to obtain in turn two independent values for the propagation time, given knowledge of the generally nonlinear functions g' and g" and of the direct and alternating components of the frequency.

The propagation time information which is contained in $\theta_-(t)$ corresponds to the envelope information of the reception signal. The propagation time information contained in $\theta_-$ corresponds to the fine structure information. The envelope information belonging to $\theta_-(t)$ is unique, but uses only a small part of the information contained in the signal. A complete evaluation of all the information contained in the signal is achieved by additionally considering the fine structure information contained in $\theta_-$, which is not unique taken per se. Given that a unique coarse estimate is obtained with the aid of the envelope information, the lack of uniqueness of the fine structure information can be eliminated, and then a unique, accurate determination of the signal propagation time can be obtained by linear combination of the two measured values. By contrast with known FMCW methods, this procedure uses the entire information present in the reception signal for a decisive improvement in the measuring accuracy reaching as far as the limit of signal theory.

In the case of an arbitrary modulation signal, the envelope information can be determined by determining a scaling factor between the alternating component $\theta_-(t)$ of the time phase difference function and the alternating component $f_-(t)$ of the modulation frequency function, and a coarse measure of the propagation time can thus be obtained. The fine structure information follows from the mean of the phase difference function referred to the direct component $f_-$ of the modulation frequency.

In the special case of linear modulation, the alternating component of the instantaneous frequency can be written as $$f(t) = \frac{f_E - f_A}{T} \cdot t; \quad \frac{-T}{2} \le t \le \frac{T}{2}$$

with the initial modulation frequency $f_A$ and the final modulation frequency $f_E$ and the signal duration T. It then holds that $$f_- = f_0 \text{ and } f_-(t) = f(t).$$

After integration of the modulation frequency over short propagation times τ, the time difference function of the phases is then $$\theta(t) = 2\pi\tau\left(f_0 + \frac{f_E - f_A}{T} \cdot t\right) = \theta_- + \theta_-(t), \text{ in which } \frac{-T}{2} \le t \le \frac{T}{2}$$

where $$\theta_- = 2\pi\tau_0 \text{ and}$$

$$\theta_-(t) = 2\pi\tau \cdot \frac{f_E - f_A}{T} \cdot t$$

The determination of the two items of propagation time information from the envelope information θ_(t) and the fine structure information θ_ can be performed in this case in the time domain, for example by linear regression of the instantaneous phase values. The differential phase values θ(t) recorded at the time of the signal duration T are linearized using a mean straight line, with the result that the gradient, explained further above, of the phase straight line of the propagation time τ is proportional to the envelope. The mean of the measured phase values divided by the carrier frequency is proportional to the propagation time τ to be extracted from the fine structure information.

A first, unique distance value can be calculated from the gradient of the mean straight line, but it is affected by a comparatively high statistical uncertainty. This first measured value is subsequently converted into a unique item of phase information. 2π is now added to the mean of the measured phase values, which lies between 0 and 2π until the resulting value comes as close as possible to the value determined from the gradient of the mean straight line. A second, unique distance value with a substantially smaller variance can be obtained directly from the phase value obtained in this way. The two distance values can be combined with one another linearly to form a final measured value, in order to obtain an optimum statistical efficiency.

By way of an example implementation utilizing the processes of the present invention, FIG. 3 shows conventional hardware components, such as a power splitter 22, a mixer 20 and a low pass filter 24, which can be used to generate the in-phase signal I(t) 26 and the quadrature phase signal Q(t) 28. This implementation is called a quadrature demodulator and is a standard element of communications. In FIG. 4A, this entire implementation shown in FIG. 3 can be integrated in the block marked "Receiver" 30. The signals I(t) and Q(t) from the receiver are sampled (A/D) and then processed in, for example, a software program. The various processing steps are also shown in FIG. 4A. The left-hand branch 32 incorporates the fine structure information (as represented by the direct component θ_) and the right-hand branch 34 contains the enveloping curve information (as represented by the alternating component θ_(t)). Furthermore, in the enclosed examples, a linear frequency modulated laser signal was adopted (see θ(t) in the phase diagram, as shown in FIG. 4B).

Special algorithms, such as the Fast Fourier Transformation for example, are known for evaluation in the frequency domain.

The determination of the two items of propagation time information can be performed analogously in the case of a slightly nonlinear modulation of the transmission signal.

DESCRIPTION OF THE DRAWINGS

The method according to the invention is explained below with the aid of exemplary embodiments represented diagrammatically in the drawing, in which in detail:

FIG. 4A shows an implementation of processing steps of the present invention.

FIG. 4B shows a phase diagram of an example linear frequency modulated laser signal.

DESCRIPTION OF THE EXEMPLARY EMBODIMENTS

Figure 1:
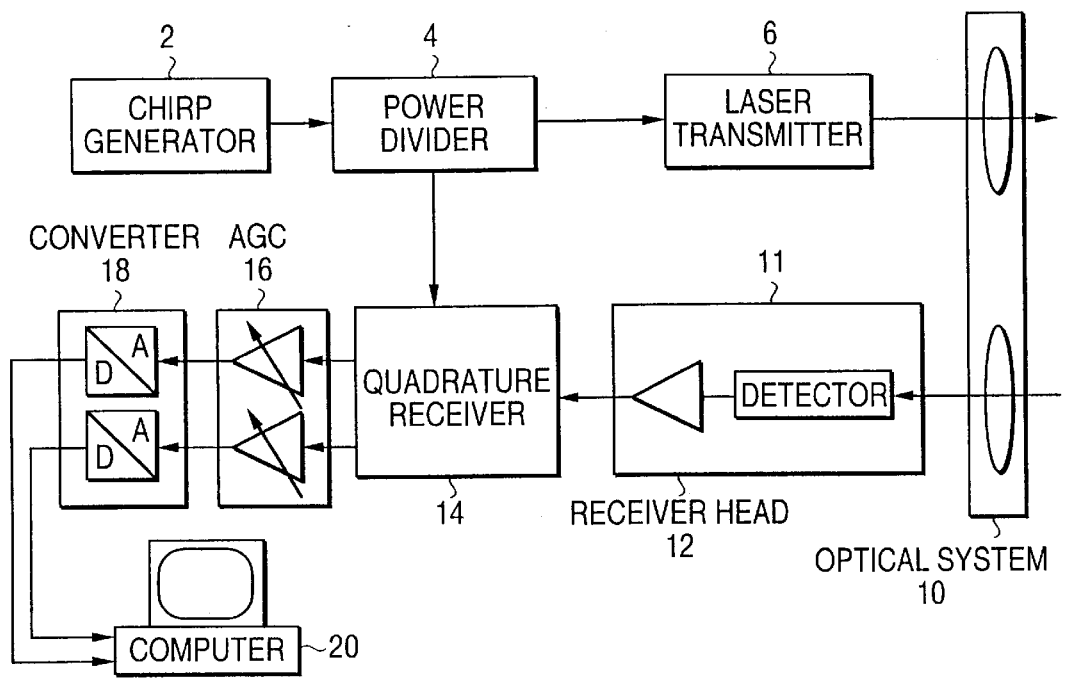
FIG. 1 shows a sketch of the principle of a laser-aided telemeter.

In FIG. 1, a chirp generator 2 generates a signal which is frequency-modulated in a linear fashion and split at a power splitter 4 into a transmission signal and a reference signal. The transmission signal modulates the intensity of a laser beam, which serves as carrier wave. A part of the intensity-modulated laser beam can also be taken as reference signal. The laser beam is directed via a transmitting optical system 10 onto an object point (not represented). A part of the light is reflected or scattered at the object and focused by the receiving optical system 10 onto a detector 11 which converts the optical received power into an electric signal.

After amplification, the signal passes, together with the reference signal, into a quadrature receiver 14, in which the transmission signal and the reception signal are multiplied by one another in a complex fashion. The result is a complex phasor whose time phase function corresponds to the differential phase θ(t) between the transmission and reception signals. In this exemplary embodiment, the real and imaginary parts of the complex phasor are digitized after traversing an AGC 16 (Automatic Gain Control) amplifier via analog-to-digital converters 18, and processed in a computer 20 in accordance with the method according to the invention for the purpose of determining the instantaneous phase function and subsequently determining the signal propagation time. The circuit arrangement so far described is known per se.

The distance sensor of this design is therefore suitable both for the high-resolution distance measurement and, in conjunction with a scanning unit, for the three-dimensional measurement of objects or for various tasks in monitoring dimensional tolerances in quality assurance, or in surveying buildings or as a visualization system in robotics.

In addition to the propagation of the transmission and reception beams in free space as represented, it is also possible to interpose arbitrary optical components for directing light such as, for example, fiber-optic elements.

The same measurement principle can also be realized by using a carrier wave in the RADAR frequency band. For this purpose, the laser transmitter 6 in FIG. 1 is to be replaced by a transmitting antenna, and the detector 11 by a receiving antenna. With the aid of the envelope information and fine structure information, the telemeter thus constructed can measure the distance to an object which reflects the radar waves in a highly resolving fashion in the radial direction in a similar way as the laser-aided telemeter.

The measurement method can, moreover, also be realized by using an acoustic carrier wave. For this purpose, the laser transmitter 6 is replaced by a transmitting acoustic transducer, and the detector 11 is replaced by a receiving acoustic transducer.

Figure 2:
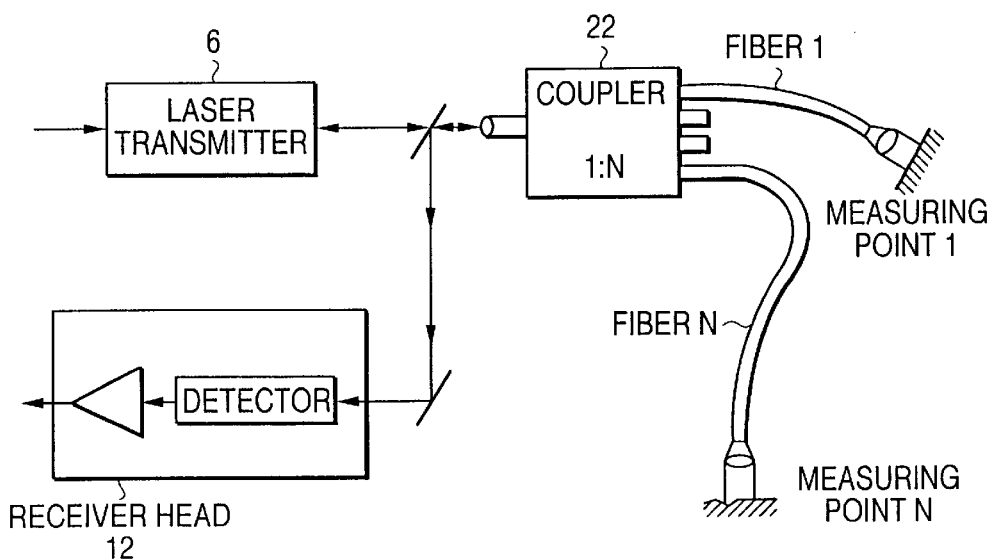
FIG. 2 shows a sketch of the principle of a fiber-optic telemeter for simultaneously measuring a plurality of measuring points.
Figure 3:
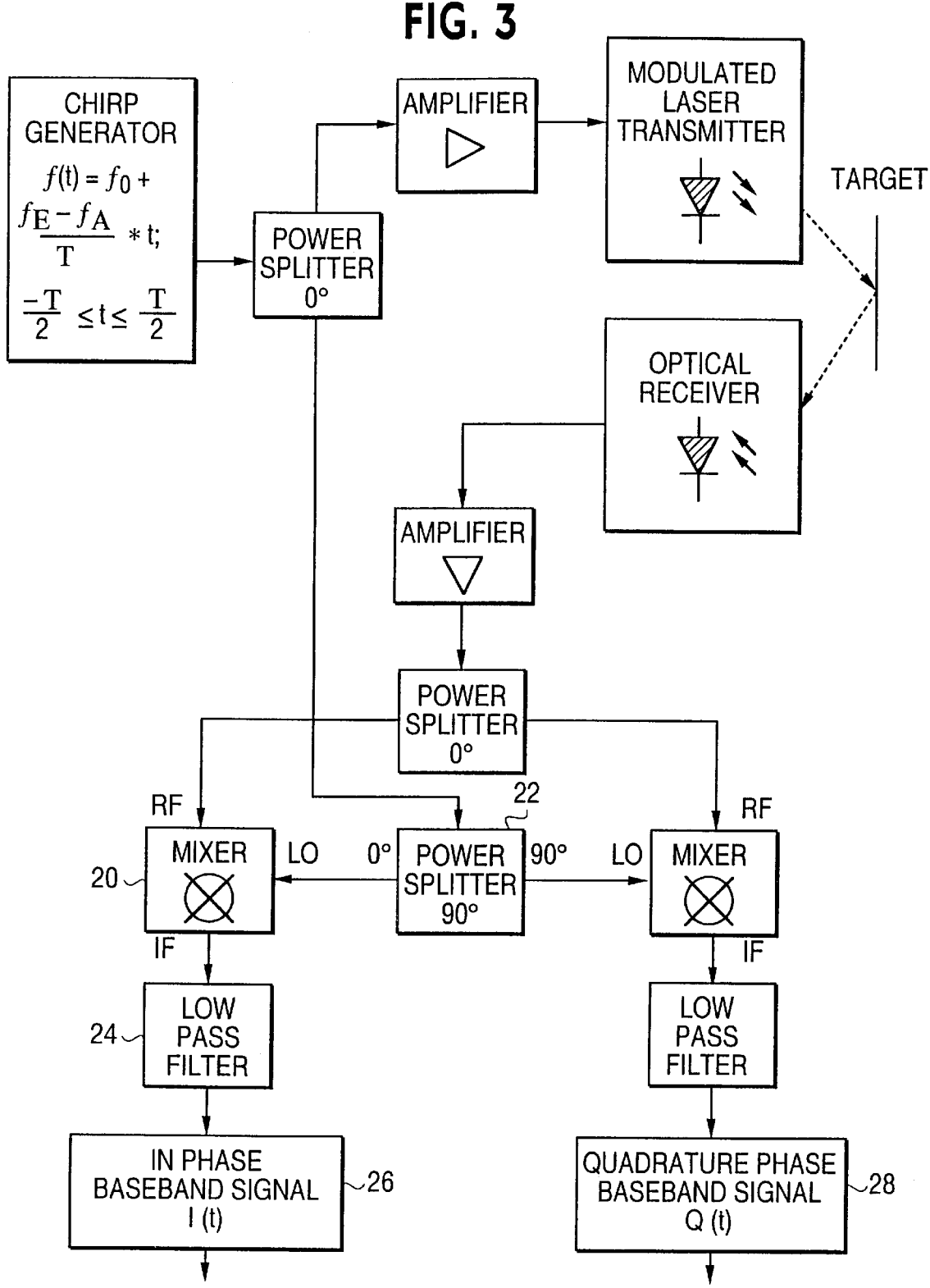
FIG. 3 shows example hardware components of a quadrature receiver.

FIG. 2 shows an advantageous embodiment of a measuring arrangement in which the method according to the invention can be applied, and which permits simultaneous measurement of a plurality of measuring points. Use is made of the already mentioned possibility of interposing fiber-optic light guides. A common transceiver optical system is assigned a coupler 22 which distributes the transmission beam over a plurality of light guides, and brings together again the beams reflected at the measuring points. Arranged between the laser transmitter and coupler is a beam splitter which leads the reception signal to the detector. The signal-generating and signal-processing elements (not represented) correspond to those in FIG. 1.

The signal is advantageously in turn evaluated with the aid of a quadrature demodulator, an AGC amplifier and a digital signal processing system. If the sums of the glass fiber length and measured distance are sufficiently different for the individual fibers, the component of the reception signal belonging to each measuring point can be separated, for example, in the frequency band, and evaluated separately in each case using the envelope information and fine structure information. Under the same preconditions, this also holds, of course, even in the case of transmission in free space, with the result that objects situated at different distances can be measured simultaneously in a single measurement operation.

The transmitting optical system represented in FIG. 1 can be used simultaneously as receiving optical system 10, instead of the coupler in FIG. 2. In this case, the optical system can be provided with a coating which retroflects a part of the transmission wave directly into the receiver head. This produces an internal reference path of known length. The comparison measurement is performed simultaneously with the object measurement, with the result that identical conditions obtain for the apparatus and, for example, drifting of the electronic components or in the transmitter power play no role. The advantage of a common transceiving optical system resides in that the maximum possible received power is present even given short object distances.

What is claimed is:

1. A FMCW distance measurement method, comprising:
   modulating a wave train of carrier frequency $f_0$ by a time function $f(t)$ and splitting said wave train into a transmission signal and a reference signal in a deterministic phase relationship;
   putting the transmission signal onto a transmission link to be measured and feeding the reference signal to a phase difference-forming arrangement;
   feeding a signal reflected in the transmission link and delayed by the propagation time $\tau$ as a reception signal to the phase difference-forming arrangement;
   wherein the phase difference-forming arrangement forms the time difference function $\theta(t)$ of the phases between the reference and reception signals;
   evaluating the phase difference function $\theta(t)$ separately with respect to a direct component $\theta_= = g'(\tau, f_0)$ assigned to the carrier frequency $f_0$ and with respect to an alternating component $\theta_-(t) = g''(\tau, f_-(t))$ assigned to the modulation time function $f(t)$; and
   determining the propagation time $\tau$ proportional to the distance by a combined evaluation of said direct component and said alternating component of the phase difference function.

2. The distance measurement method according to claim 1, wherein in the case of short propagation times $\tau$, the evaluation of the phase difference function $\theta(t)$ with respect to the direct component is performed in accordance with $\theta_=(t) = 2\pi\tau f_=$, and with respect to the alternating component is performed in accordance with $\theta_-(t) = 2\pi\tau f_-(t)$.

3. The distance measurement method according to claim 1, wherein as the phase difference-forming arrangement, use is made of a quadrature receiver in which the reference and reception signals are multiplied by one another in a complex fashion to produce a complex phasor whose time phase function corresponds to $\theta(t)$.

4. The distance measurement method according to claim 1, further comprising determining a unique coarse value for the distance from $\theta_-(t)$, and wherein a fine correction is determined from $\theta_=$.

5. The distance measurement method according to claim 1, wherein the phase difference function $\theta(t)$ is determined simultaneously for different transmission links and is evaluated with regard to the direct and alternating components.

6. The distance measurement method according to claim 5, wherein the phase difference function $\theta(t)$ of an internal transmission link of known length is formed and evaluated.

7. A FMCW distance measurement apparatus, comprising:
   a transmitter coupled to a modulator, said transmitter generating a modulated wave-form;
   a receiver to receive a portion of said modulated waveform that is reflected off a target;
   a quadrature receiver to receive a reception signal corresponding to an electrical representation of said reflected portion of said modulated waveform and a reference signal corresponding to said transmitted modulated waveform, wherein said quadrature receiver generates a complex phasor having a time phase function corresponding to a phase difference function $\theta(t)$ between said reference signal and said reception signal; and
   a processor coupled to said quadrature receiver to evaluate said phase difference function $\theta(t)$ separately with respect to a direct component $\theta_= = g'(\tau, f_0)$ assigned to a carrier frequency $f_0$ and with respect to an alternating component $\theta_-(t) = g''(\tau, f_-(t))$ assigned to a modulation time function $f(t)$ and to determine a propagation time $\tau$ proportional to the distance to said target by a combined evaluation said direct component and said alternating component of the phase difference function.

8. The distance measurement apparatus according to claim 7, wherein in the case of short propagation times $\tau$, evaluation of the phase difference function $\theta(t)$ with respect to the direct component is performed in accordance with $\theta_=(t) = 2\pi\tau f_=$, and with respect to the alternating component is performed in accordance with $\theta_-(t) = 2\pi\tau f_-(t)$.

9. The distance measurement apparatus according to claim 7, wherein said processor further determines a unique coarse value for the distance to said target from $\theta_-(t)$, and wherein a fine correction is determined from $\theta_=$.

10. The distance measurement apparatus according to claim 7, wherein said phase difference function $\theta(t)$ is determined simultaneously for different transmission links and is evaluated with regard to said direct and alternating components.

11. The distance measurement apparatus according to claim 10, wherein said phase difference function $\theta(t)$ of an internal transmission link of known length is formed and evaluated.

* * * * *